Figure 1:
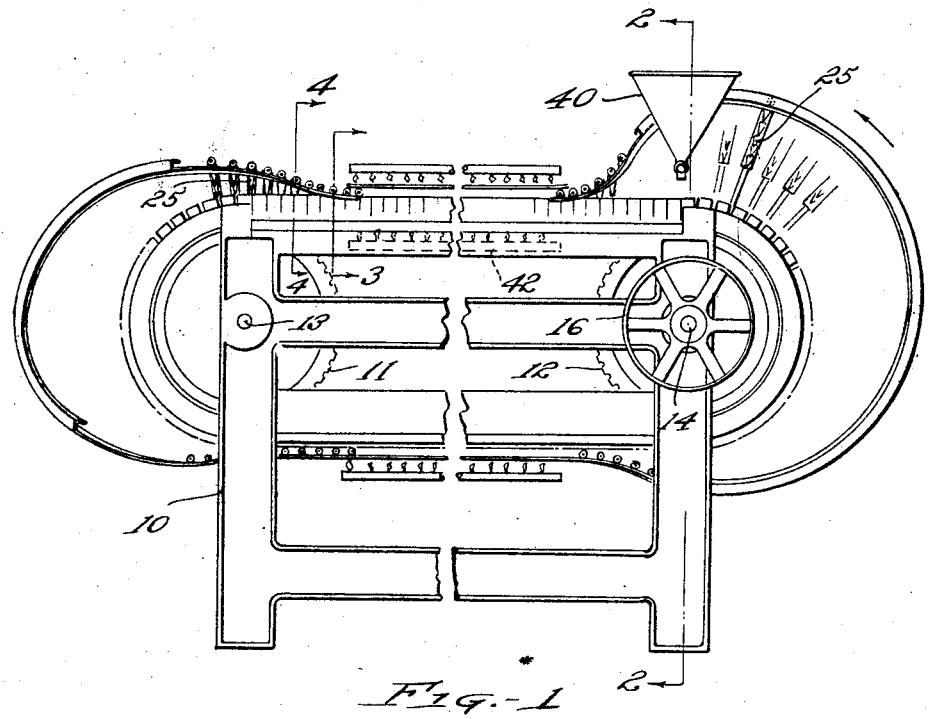

Feb. 16, 1926.

J. T. TURNER 1,573,588

MACHINE FOR MAKING ICE CREAM CONES

Filed August 6, 1923    3 Sheets-Sheet 1

INVENTOR
James T. Turner,
By Bates + Macklin
ATTORNEYS

Feb. 16, 1926. 1,573,588
J. T. TURNER
MACHINE FOR MAKING ICE CREAM CONES
Filed August 6, 1923  3 Sheets-Sheet 3

INVENTOR
James T. Turner,
By Bates & Machlin,
ATTORNEYS

Patented Feb. 16, 1926.

1,573,588

UNITED STATES PATENT OFFICE.

JAMES T. TURNER, OF ATLANTA, GEORGIA.

MACHINE FOR MAKING ICE-CREAM CONES.

Application filed August 6, 1923. Serial No. 655,853.

*To all whom it may concern:*

Be it known that I, JAMES T. TURNER, a citizen of the United States, residing at Atlanta, in the county of Fulton and State of Georgia, have invented a certain new and useful Improvement in a Machine for Making Ice-Cream Cones, of which the following is a full, clear, and exact description, reference being had to the accompanying drawings.

This invention relates to improvements in machines for making ice cream cones and particularly to improvements in a machine shown and described in Patent No. 1,393,587 issued to me October 11, 1921.

The machine set forth in the above patent, briefly comprises a series of cooperating molds in an endless conveyer which is caused to be moved continuously beneath a batter hopper and through a suitable baking heat to a discharge point. The female molds comprise links in the endless conveyer while the male molds are pivoted to successive links and are adapted to shape the batter before and during the baking process. Moreover, the male dies are arranged to move outwardly at suitable points in the cycle to permit the discharge of the baked cone and the insertion of fresh batter. The male mold depends from a transversely extending bar which is pivoted as heretofore stated to the female die, and is adapted to be moved outwardly about said pivotal connection. I have found that considerable breakage of the baked cone is apt to occur particularly in the molds which are disposed adjacent the pivotal connections, since the sides of the male dies bear against the inner face of the cone during the withdrawing operation.

One of the objects of the present invention therefore, is the provision of means for enabling all of the male members to be withdrawn without breaking any of the cones. In this connection, my invention contemplates the provision of means which may be readily used on machines set forth in the above mentioned patent without necessitating extensive changes in the construction thereof.

I carry out the above object preferably by employing a lost motion connection between the male and female dies, wherefore the male members may be withdrawn in a longitudinal direction a predetermined distance, before they are caused to be swung about the pivotal connection. Thus, sufficient clearance for the sides of the male members is provided to avoid breakage of the product.

The means for carrying out my invention is illustrated in the preferred form in the accompanying drawings and is hereinafter described in detail. The essential features are summarized in the claims.

Figure 3:
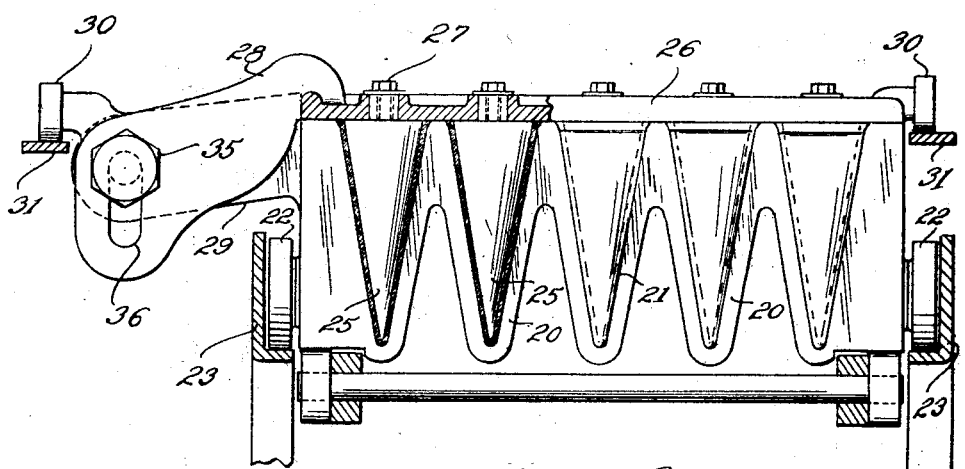
Figure 2:
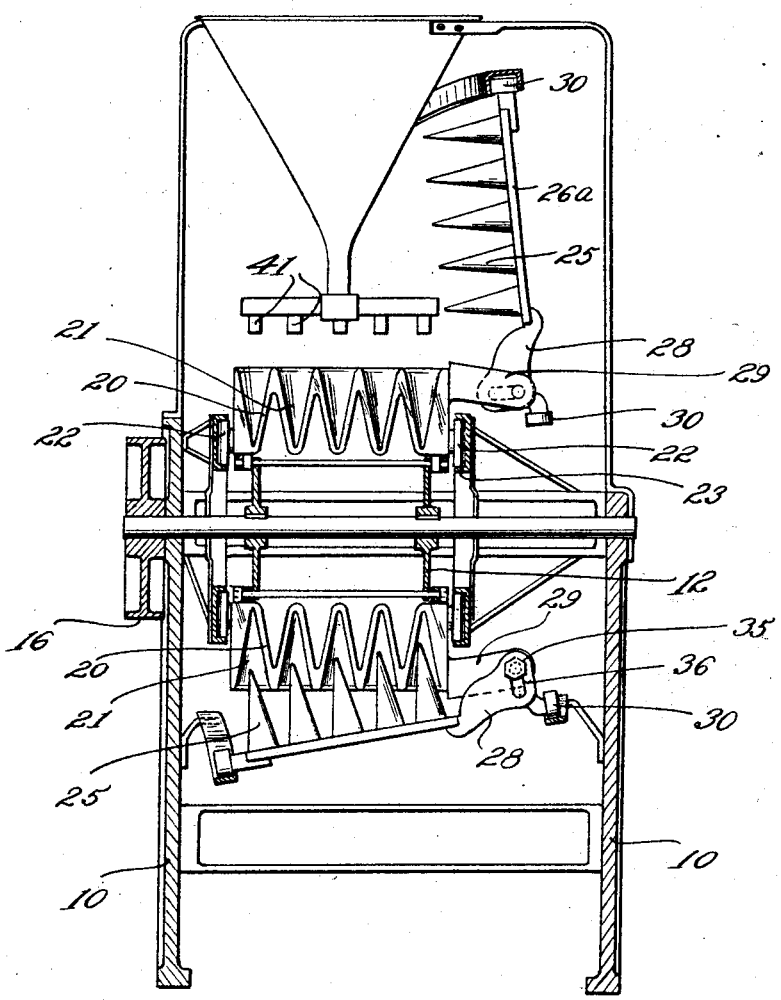
Figure 4:
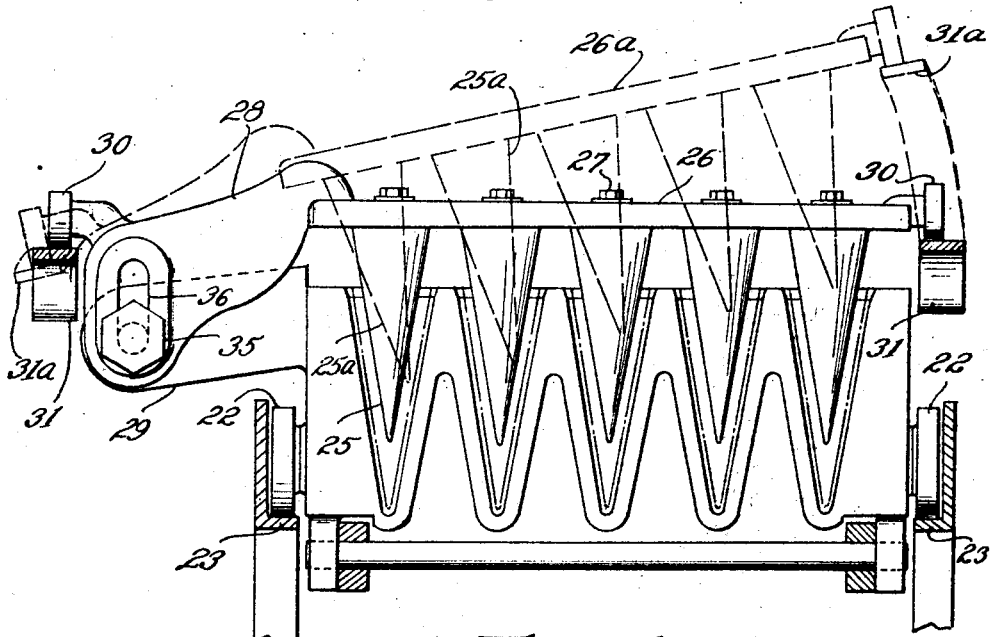
Figure 5:
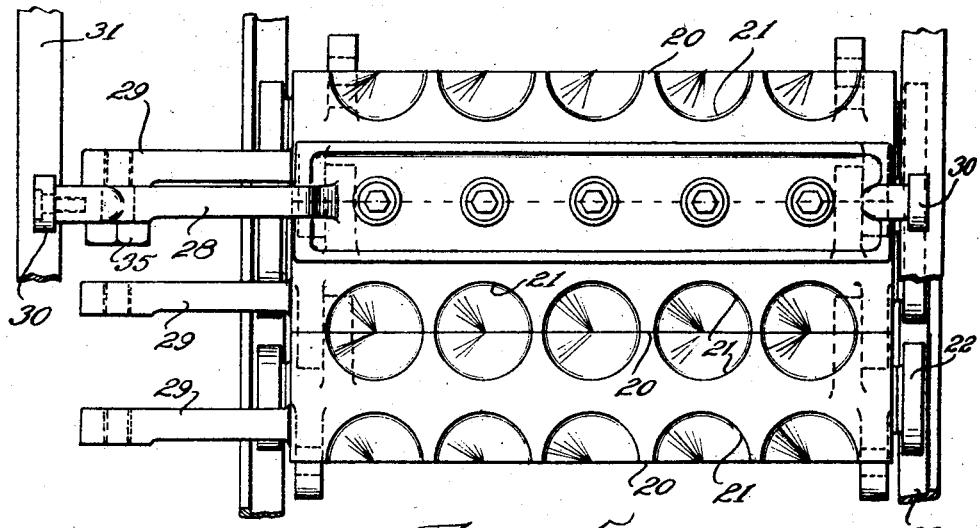

In the drawings, Fig. 1 is a side elevation of a machine embodying my invention; Figs. 2, 3 and 4 are sections taken on the correspondingly numbered lines in Fig. 1; and Fig. 5 is a plan view of a portion of the machine illustrating the relation of the cooperating mold members.

In the drawings, 10 designates a frame having at the ends thereof sprocket wheels 11 and 12 which are mounted on transverse shafts 13 and 14 respectively. Around the sprocket wheels is carried an endless belt or conveyer having links each comprising a plurality of conical mold members. The conveyer may be advanced by rotation of the shaft 14 as by the application of power to a suitable pulley wheel 16 secured to an end of the shaft projecting outside the frame.

Each link of the conveyer comprises rectangular blocks 20 each having semi-conical recesses 21 on the opposite sides thereof which recesses extend from the top of block nearly but not quite to the bottom. The oppositely disposed recesses cooperate to form conical female mold members. These members are supported by wheels 22 which are adapted to travel in a trackway 23 extending around the frame and supported thereby.

The male members are illustrated at 25 as arranged in a transverse row and as being attached to a block 26 as by securing members 27. Each block may be provided with an arm 28 which projects over the trackway 23 and is pivotally connected to an arm 29 carried by the block 20. The block 26 is moreover, supported in proper position with relation to the female molds by wheels 30 which travel on trackways 31. These trackways are independent of the trackway 23 and are arranged to extend in a loop adjacent the end of the machine as illustrated in Fig. 1 for causing the male members to be withdrawn from the cooperating dies.

To utilize a relatively short arm 28 intermediate the pivotal connection with the arm 29 and the mold members and at the same time to permit withdrawal of the male members without breakage of the baked product, I provide a lost motion connection between the arms 28 and 29 and arrange trackways 31 so as to raise the block 26 vertically before allowing it to be swung about the pivotal connection. The lost motion connection may be obtained by providing a member 35 which extends through a slot 36 in the arm 28 and is rigidly connected to the arm 29. The length of the slot 36 is such that the members 25 may be lowered into the cooperating molds 21 and positioned therein at a proper depth by engagement of the block 26 with the block 20. Moreover, the block is of such length that the male members may be moved outwardly a predetermined distance while remaining parallel to the original position.

The initial movement of the male members is preferably obtained by making the rise in each trackway 31 equal for a predetermined length. The position of the male members with relation to the female dies, when the wheels 30 have just engaged the trackways 31, is illustrated in Fig. 3. A corresponding position of the dies when the wheels have been elevated due to the rise in the trackways 31 is shown in Fig. 4 in full lines, wherein the male members are withdrawn an equal distance from the cooperating dies. During this movement, the slot 36 has moved outwardly wherefore the pin is thrown into engagement with the bottom of the slot.

From this point in the cycle of operation, the trackways 31 are raised on one side and lowered on the other, as at 31ᵃ, while the male members and the associated block 26 are moved to the position indicated by the broken lines 25ᵃ and 26ᵃ respectively in Fig. 4.

In operation, the endless mold conveyer is moved by rotation of the sprocket wheel 12 by means of the pulley 16 at the end of the machine carrying the hopper 40. The trackways 31 cause the male dies 36 to be opened outwardly, and in this position, oil or grease may be applied to them in the form of a spray. Dough or batter from the hopper 40 may be continuously discharged by gravity through the discharge plug 41 into the open conical cavities 21 as the molds pass in succession beneath the hopper and along the trackway 23. The small amount of dough flowing on the tops of the female dies between the cavities assists in forming a closed joint with the male block 26 and also to some extent, assist in the removal of the cones after they are baked. After the batter has entered the dies 21, then the dies 25 are caused by the combined influence of gravity and the conformation of the runways 31 to close downwardly thereby forcing the batter upwardly and into the space between the walls of the dies and shaping it in the form of the finished cone. The filled and closed molds then pass through a heating zone where gas jets 42 may be directed on the outer walls of the molds.

After emerging from the baking zone, the wheels 30 encounter the runways 31 which cause the molds 25 to be moved outwardly to the position shown by full lines in Fig. 4 and thereby cause the block 36 and the arm 28 to move upwardly until the bottom of the slot engages the pin 35. This outward motion is then arrested and the conformation of the trackways 31 is such that the male members are swung about the pivotal connection as indicated by the broken lines in Fig. 4. As the conveyer links constituting the female dies pass around the sprocket wheel, they will necessarily open or gap at the top or outer portion thereby causing the cavities 21 to become enlarged and permitting the baked cone therein to drop out or be readily removed. The ejection of the finished product occurs in the region of the sprocket 11.

From the foregoing description, it will be seen that I have provided a mechanism which causes the relatively movable mold members to be withdrawn initially in one direction and subsequently in a different direction, wherefore there is no sliding engagement between the mold member of the finished product and accordingly breakage due to withdrawing of the molds is eliminated.

I claim:—

1. In a device of the character described, the combination with a pair of cooperating mold members, one of the members having a sliding pivotal connection with the other so as to be moved relatively thereto, and means for withdrawing the movable member along a straight line and subsequently swinging it in an arc tangent to the straight line about the pivotal connection.

2. In a device of the character described, the combination with a pair of cooperating mold members, a trackway along which the mold members are adapted to move, one of said members having a lost motion connection with the other, the trackway having such conformation that the movable member is withdrawn in a straight line sufficiently to take up the slack in said connection and is then swung in a direction transverse to the movement of the molds along the trackway about a pivotal connection.

3. In a device of the character described, the combination with a conveyer, of means for moving the same, said conveyer comprising links pivoted together, said links cooperating to form pairs of female members, each male member cooperating with one pair of the first mentioned members, means for moving and positioning the male members whereby the initial movement thereof is in a straight line, and subsequent movement is in a curved line.

4. In a device of the character described, the combination with a conveyer, of means for moving the same, said conveyer comprising links pivoted together, said links comprising blocks having complementary recesses in their adjacent sides, means for opening and closing said recesses, male members coacting with the recesses and means for moving the male members first along the axes of the female members and then in another direction to withdraw them from said recesses.

5. In a device of the class described, the combination with a conveyer comprising a series of links pivoted together, each link forming part of an open-sided recess, a projection pivoted to one of the links and adapted to occupy said recess, and means for withdrawing the projection from the recess in such manner that initial movement withdraws the projection along the axis of the recess and subsequent movement swings said projection about said pivotal connection.

6. In a device of the character described, the combination with a conveyer, of means for moving the same, said conveyer comprising a series of links pivoted together, said links cooperating to form separable recesses, a projection cooperating with each recess, and means for pivotally mounting the projections on said links so as to provide a lost motion connection therewith.

7. In a device of the character described, the combination with a conveyer, of means for moving the same, said conveyer comprising links pivoted together and comprising a line of separable female mold members, male members carried by said links and means for withdrawing the male members by imparting two different motions thereto, in a plane coincident with the separating face of one of the female mold members, the first motion being along a line parallel to the axes of the female mold members, whereby the male member may be withdrawn without engaging the walls of the cooperating member.

8. In a device of the character described, the combination with a conveyer comprising a series of pivoted links, said links having open sided recesses in their sides, means operable upon a change of direction in the movement of the links for closing and opening said recesses, male members adapted to coact with the recesses, means for mounting the male members on the links so as to provide a lost motion connection therewith, and other means for withdrawing the male members by moving them in a vertical line so as to take up the slack in the lost motion connection and then to move them in a curved path by swinging them about a pivotal connection.

In testimony whereof I hereunto affix my signature.

JAMES T. TURNER.